United States Patent
Digman et al.

(10) Patent No.: US 6,298,641 B1
(45) Date of Patent: Oct. 9, 2001

(54) STONE EJECTION FOR A FEEDERHOUSE ON AN AGRICULTURE COMBINE

(75) Inventors: Michael J. Digman, Denver; David N. Heinsey, Stevens; James A. Bennett, Narvon, all of PA (US); Yuan Cyriel Cornelius Vandergucht, Lo-Reninge (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/540,989

(22) Filed: Mar. 31, 2000

Related U.S. Application Data

(60) Provisional application No. 60/128,717, filed on Apr. 12, 1999.

(51) Int. Cl.$^7$ ..................................................... A01F 12/10
(52) U.S. Cl. .......................... 56/10.2 J; 460/2; 460/106
(58) Field of Search ......................... 56/16.2 R, 10.2 J, 56/DIG. 15; 460/2, 3, 105, 106, 119, 150

(56) References Cited

U.S. PATENT DOCUMENTS

| | | |
|---|---|---|
| 3,675,660 | 7/1972 | Girodat . |
| 4,275,546 | 6/1981 | Bohman et al. ...................... 56/10.2 |
| 4,288,969 | 9/1981 | Underhill .............................. 56/10.2 |
| 4,294,062 | 10/1981 | Seymour ................................ 56/102 |
| 4,305,244 | 12/1981 | Seymour et al. ..................... 56/10.2 |
| 4,322,933 | 4/1982 | Seymour ............................... 56/10.2 |
| 4,335,565 | 6/1982 | Knepper et al. ...................... 56/10.2 |
| 4,343,137 | 8/1982 | Seymour ............................... 56/10.2 |
| 4,353,199 | 10/1982 | Chow et al. .......................... 56/10.2 |
| 4,720,962 | 1/1988 | Klinner ................................. 56/10.2 |
| 4,768,525 | 9/1988 | Tanis .................................... 56/10.2 |
| 5,702,300 | 12/1997 | Wilson ................................. 460/106 |

*Primary Examiner*—Robert E. Pezzuto
(74) *Attorney, Agent, or Firm*—J. William Stader; Larry W. Miller

(57) ABSTRACT

The apparatus is an improvement to a feederhouse on an agricultural combine. The apparatus has a first acoustic array having a first sounding board and acoustic sensor positioned beneath the front drum and feederhouse floor. There is a second acoustic array positioned behind the front drum and between the conveyor chain encircling the front and rear drums. The second acoustic array also has a second acoustic sensor and second sounding plate. The acoustic sensor detects the impact of a stone on the sounding plates. A signal is transmitted via a controller from the sensor to a solenoid controlling a stone trap door latch. When the door opens, a sled also rotates into contact with conveyor chain. This deflects any crop flow containing stones. To close the door, the feederhouse is raise and the door rotates into contact with the latch.

5 Claims, 7 Drawing Sheets

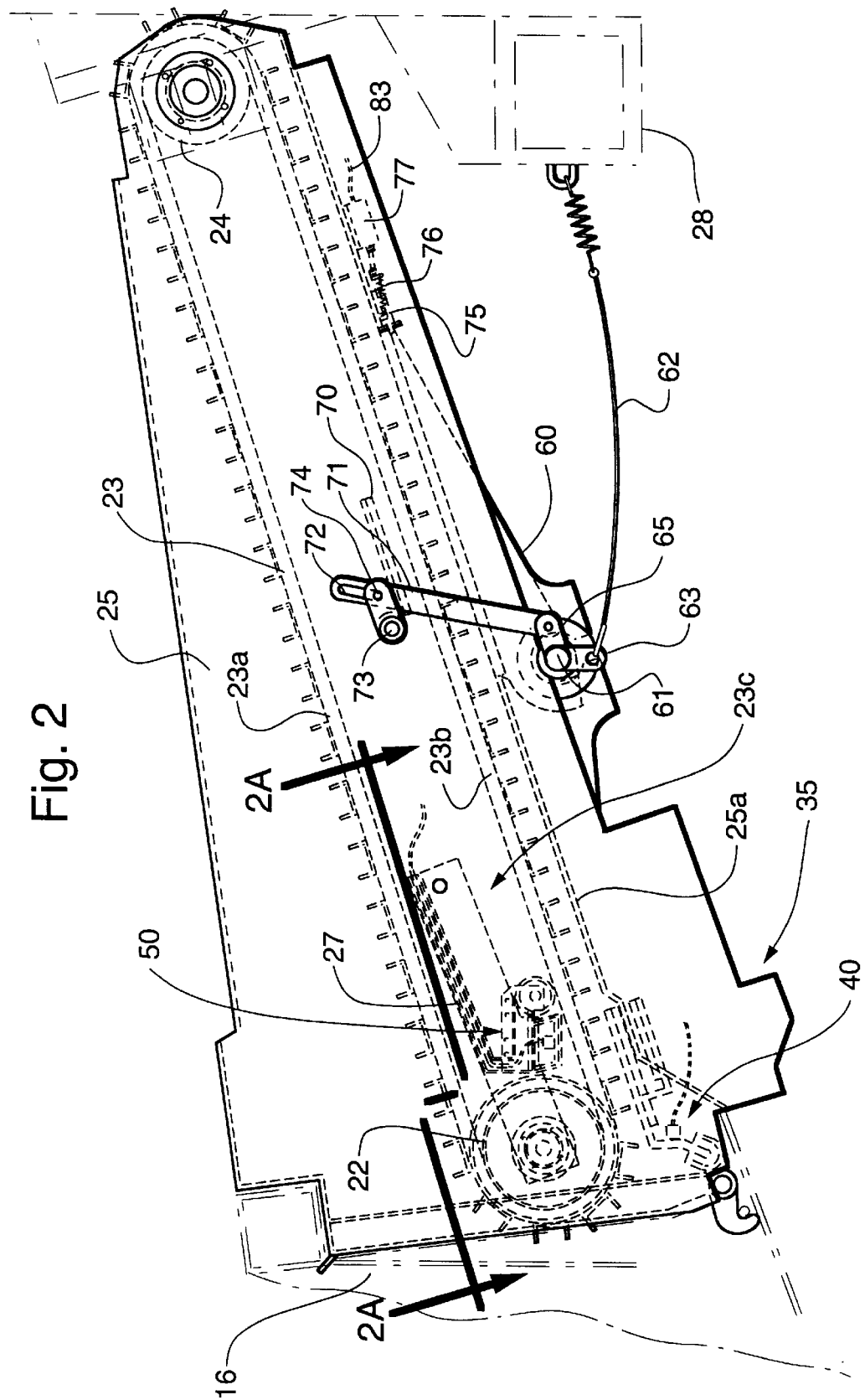

STONE EJECTION FOR A FEEDERHOUSE ON AN AGRICULTURE COMBINE

CROSS-REFERENCE TO RELATED APPLICATIONS

This application claims domestic priority on U.S. Provisional Patent Application Serial No. 60/128,717, filed on Apr. 12, 1999.

BACKGROUND OF INVENTION

1. Field of Art

This invention relates to the improvement of a feederhouse on an agricultural combine. More specifically, the invention allows for the ejection of a stone from the feederhouse.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing and separation areas of the combine. The grain is separated from the stalk by a rotor or threshing system. The grain is then moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™66, TX™68, the New Holland TWIN ROTOR® combines TR® 89 and TR® 99 for examples of existing conventional and twin rotor harvesters. U. S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously mentioned a feederhouse typically consists of a conveying chain which pushes the cut crop from the header to the front of the threshing system. The conveying chain has several crosspieces to assist in moving the crop and to ensure proper spacing. The conveying chain is powered and also positioned by a front drum and a rear drum. The front drum is positioned approximately behind the header and the rear drum is positioned approximately in front of the threshing system. As seen in FIG. 1, the drums rotate in a counter-clockwise fashion. The cut crop flow or crop mat is pushed by conveyor chain upwards along the floor of the feederhouse and towards the threshing system. Besides lifting or elevating the cut crop to the threshing and separating systems, the feederhouse provides several other functions. First, the feederhouse helps to properly position the header relative to the ground. Second, the feederhouse can be the location of a stone detection and removal means. Frequently, during farming operations, the header will inadvertently receive a stone. If the stone enters the threshing system in the combine, expensive damage will result to the threshing components. It is a critical function of a stone detection and removal system to prevent a stone from damaging the threshing system. A typical stone detection and removal system is a cylindrical stone beater or stone roll positioned near the mid-point of the feederhouse. The stone roll rotates allowing the crop mat to continue towards the rear drum and threshing system. A stone that is too large is forced from the feederhouse through a stone trap door beneath the stone roll.

Unfortunately there are several deficiencies to the current feederhouse design. The stone beater design limits the thickness of the crop flow. By limiting the amount of crop flow, it takes longer to perform farming operations. Previously, acoustic instruments have been used to detect stones entering farm equipment. Typically, the stone contacts a sounding plate. The acoustic instrument monitors the sounding plate. A stone contacting the sounding plate causes the sounding plate to emit a sound above a predetermined setting. The acoustic instrument observes this sound and halts the farming operation. It has been difficult to apply this technique of stone detection to a combine harvester. Typically if a single acoustic instrument and sounding plate is used, a stone can only be detected on the side of the crop flow closest to the detector. Stones on the opposite side or center of the crop flow are undetected. There are also additional problems with the feederhouse design. Conventional stone traps remain unlatched during farming operations. A malfunction with the spring mechanism used to keep the door closed can result in crop being inadvertently forced through the stone trap door.

The prior art illustrates these and other short-comings. U.S. Pat. No. 3,675,660 discloses a combine stone trap door premised on the rock detector circuit opening the stone trap door. It is possible that that the stone may be embedded in the crop flow and not deflected to be discharged. U.S. Pat. No. 4,275,546 discloses a stone discriminator using a single sounding plate to detect stones. This approach is unable to detect stones in the upper portion of the crop flow. It has not been able to successfully detect and eject stone sufficiently to be commercially viable. U.S. Pat. No. 4,288,969 discloses an improved stone trap seal. However, because of the angle of the conveying chain, a greater amount of crop is deflected and wasted. U.S. Pat. No. 4,294,062 discloses single sensing bar positioned at the bottom of the feederhouse and unable to sufficiently detect stones. U.S. Pat. Nos. 4,305,244, 4,322,933 and 4,343,137 illustrates a feeder house design for a combine. The lower sensing bar is used to trigger the stone trap door. However, the single sensing bar does not sufficiently detect the stones and the angle of the conveying chain results in more crop being deflected than necessary. U.S. Pat. No. 4,355,565 uses a mechanical stone beater bar to force a stone out of the crop flow. However, if the stone is too small or flat, the stone will not be detected or ejected. Also, the stone beater is only effective at lower speeds. U.S. Pat. No. 4,353,199 illustrates a single sensing bar used in a forage harvester. U.S. Pat. No. 4,768,525 illustrates a stone ejection door mechanism for harvesting equipment having a front and rear stone trap doors. U.S. Pat. No. 4,720,962 illustrates a single sensor that can be positioned in a variety of locations on a forage harvester. U.S. Pat. No. 5,702,300 illustrates a combine rock door over center closure apparatus shows a lever used to control a stone trap door.

An invention that could resolve these issues would represent an improvement to the art.

OBJECTS OF THE INVENTION

It is an object of the present invention to provide an acoustic stone trap detection system that can detect and eject stones.

It is an object of the present invention to provide two acoustic arrays that are capable of detecting stone located on the top and bottom of the crop flow through a feederhouse.

It is an object of the present invention to provide an acoustic stone detector that has one acoustic sensor positioned behind the front drum and between the conveyor chains.

It is an object of the present invention to provide a stone trap door that is positively latched during farming operations.

It is an object of the present invention to provide a stone trap door with a stone ejection sled.

It is an object of the present invention to provide a latch for a stone trap door controlled by a solenoid.

It is an object of the present invention to provide a controller capable of receiving an electrical signal from an acoustic sensor and transmitting an electrical signal to a solenoid.

It is an object of the present invention to provide a first acoustic array positioned beneath the feederhouse floor.

It is an object of the present invention to provide an improved sounding plate for the first acoustic array.

It is an object of the present invention to provide a method for detecting and ejecting a stone from a feederhouse of an agricultural combine.

SUMMARY OF THE INVENTION

The invention is an improvement to the feederhouse on an agricultural combine. The invention consists of a stone detection and ejection system on the feederhouse of an agricultural combine. The invention consists of a first acoustic array positioned beneath the front drum and having an acoustic sensor and first sound plate. The sounding plate is generally parallel to the feederhouse floor. There is a second acoustic array positioned between a conveyor chain encircling the front and rear drums. This array also has an acoustic sensor and sounding plate. The acoustic sensor used is an accelerometer that monitors the noise level of material impacting the sounding plates. When a stone impact is detected a sensor signal is sent via a controller to a latch to a stone trap door. The acoustic sensor in the second acoustic array is protected from the conveyor chain by a roller and roller support. The sensors are insulated from the rest of the feederhouse to prevent the sensors from detecting stray noise. After the solenoid releases the stone trap door latch, the door swings open and also pulls a stone ejection sled into contact with the conveyor chain. This deflects any crop flow with stones through a feederhouse floor aperture. By raising the feederhouse, a door cable rotates the door closed and re-latches the door to the feederhouse.

BRIEF DESCRIPTION OF DRAWINGS

The advantages of this invention will be apparent upon consideration of the following detailed disclosure of the invention, especially when taken in conjunction with the accompanying drawings wherein:

FIG. 2 is an enlarged side elevation of the feederhouse.

DETAILED DESCRIPTION OF THE INVENTION

Figure 1:
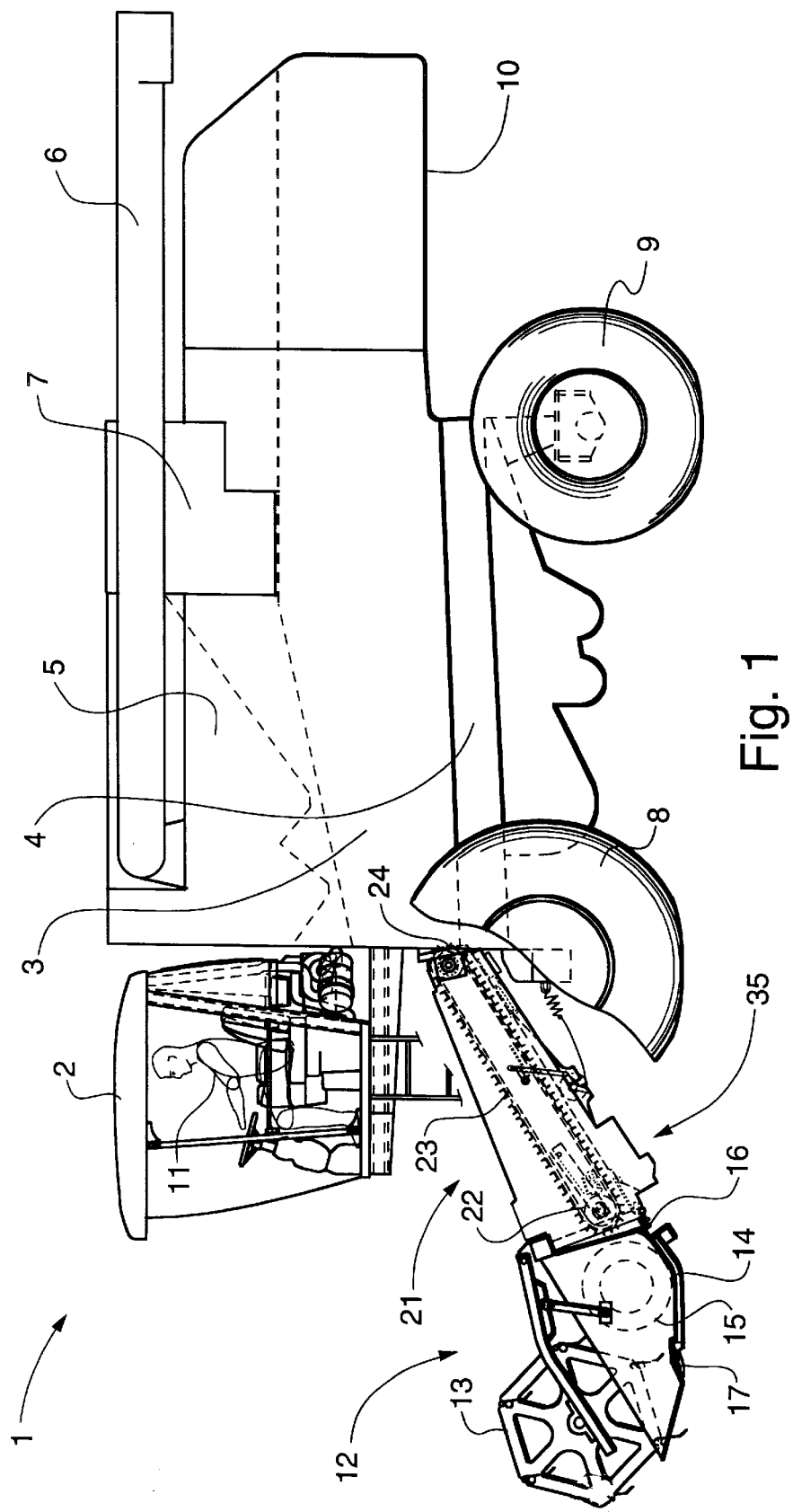
FIG. 1 is an over-all side elevation of a combine equipped with a feederhouse and a header.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

As seen in FIG. 1, the invention is located on a typical twin rotor combine 1 having a pair of front wheels 8 (only one shown) and a pair of rear wheels 9 (only one shown) for providing movement over the ground. At the front of the combine is a header 12 for cutting a crop. As the combine 1 and header 12 are moved forward, the header 12 cuts the grain and stalk. The header 12 moves the grain into an auger trough 14. A transverse auger 15 pushes the grain and stalk in the auger trough 14 to the center of the header. The header 12 illustrated in FIG. 1 is a wheat or similar small grain header. The header 12 may be positioned and re-positioned relative to the ground. The header 12 may also be tilted to the left or right or may be positioned relatively high or low to the ground. These features are constantly being adjusted depending on the terrain and crop conditions. The header reel 13 may also be positioned relative to the header 12. The position and rotation of the header reel 13, again depends on the terrain and crop conditions. Moveable headers and header reels are well known and established in the art. Located at the center of the header is the feederhouse 21 or elevator. The feederhouse 21 moves the grain and stalks rearward into the threshing 3, separation 4 and cleaning systems of the combine 1. After processing and separation, the processed grain is stored in a grain tank 5 located near the top of the combine 1. The grain is removed from the grain tank 5 by an unloading auger (not shown) through the grain tank unload tube 6. Usually during the harvesting operations, the unloading auger remains off and the grain tank unload tube 6 remains positioned by the grain tank 5. However, the combine can be unloaded 'on the go'. A separate vehicle such as a truck or tractor-pulled grain cart follows the operator. The processed grain is discharged while the combine and separate vehicles are moving. After sufficient grain has been accumulated in the grain tank 5, the operator activates the unload tube 7. The operator 11 then positions the end of the unload tube 6 over a receptacle. Unloading augers and unload auger grain tubes are well known and established in the art. The trash or chaff is ejected from the rear of the combine by a chaff spreader 10. The operator 11 controls the combine 1 from the cab 2 located behind the header 12 and at the front of the combine. From the cab the operator can observe most the various combine functions. The cab 2 usually has a large glass window or several windows which afford the operator the maximum ability to monitor the header 12. The combine 1 and various systems are powered by an engine 7 generally positioned at the rear of the combine 1. Most of the major systems in a combine are discussed and well known in the prior art.

Figure 2A:
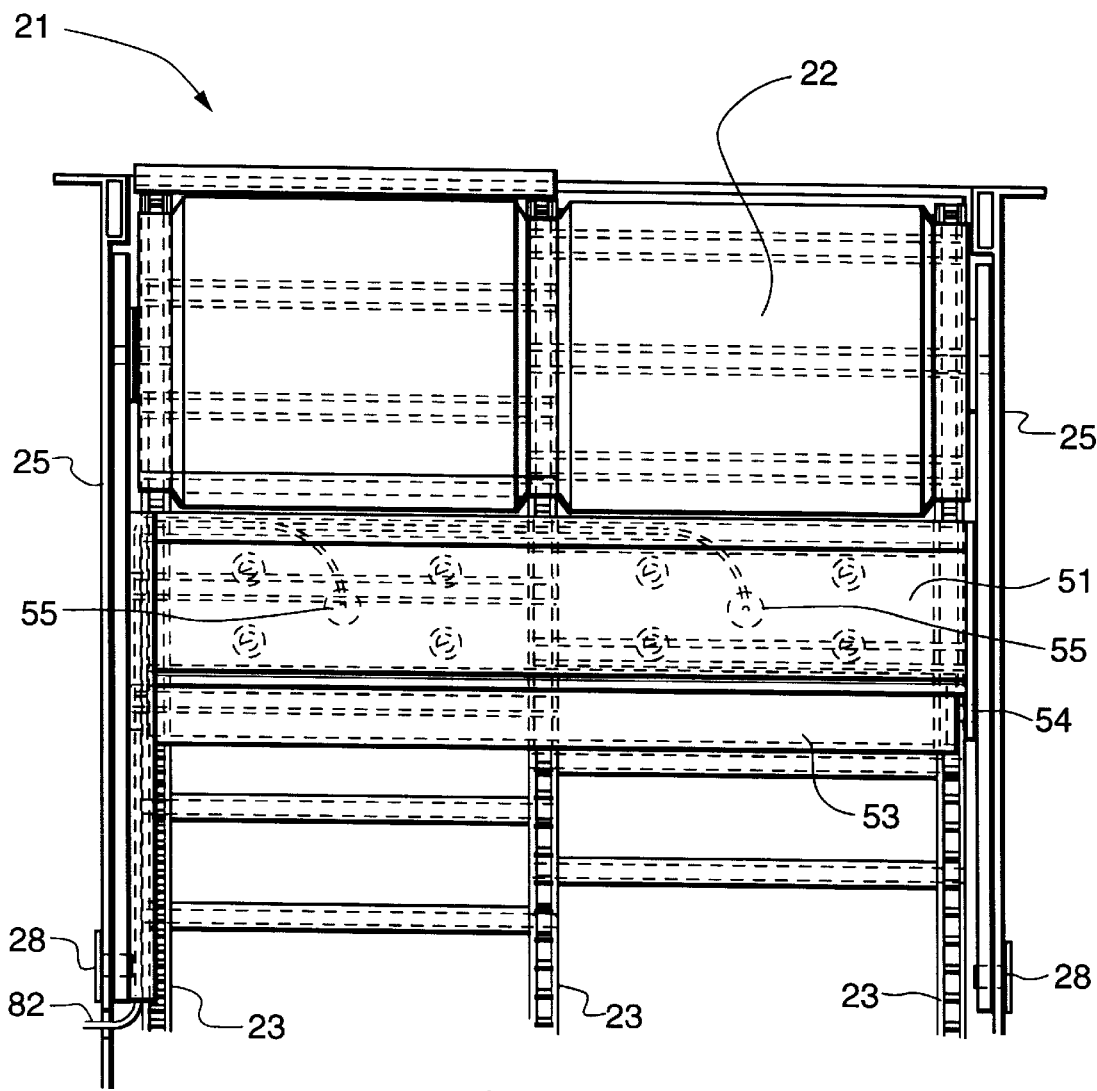
FIG. 2A is an enlarged view of the second acoustic array taken on line 2A—2A of FIG. 2.
Figure 7:
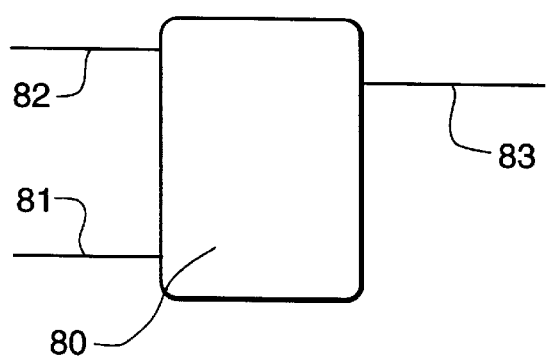
FIG. 7 is a schematic illustrating the controller and wires from the acoustic sensors and to the solenoid.
Figure 3:
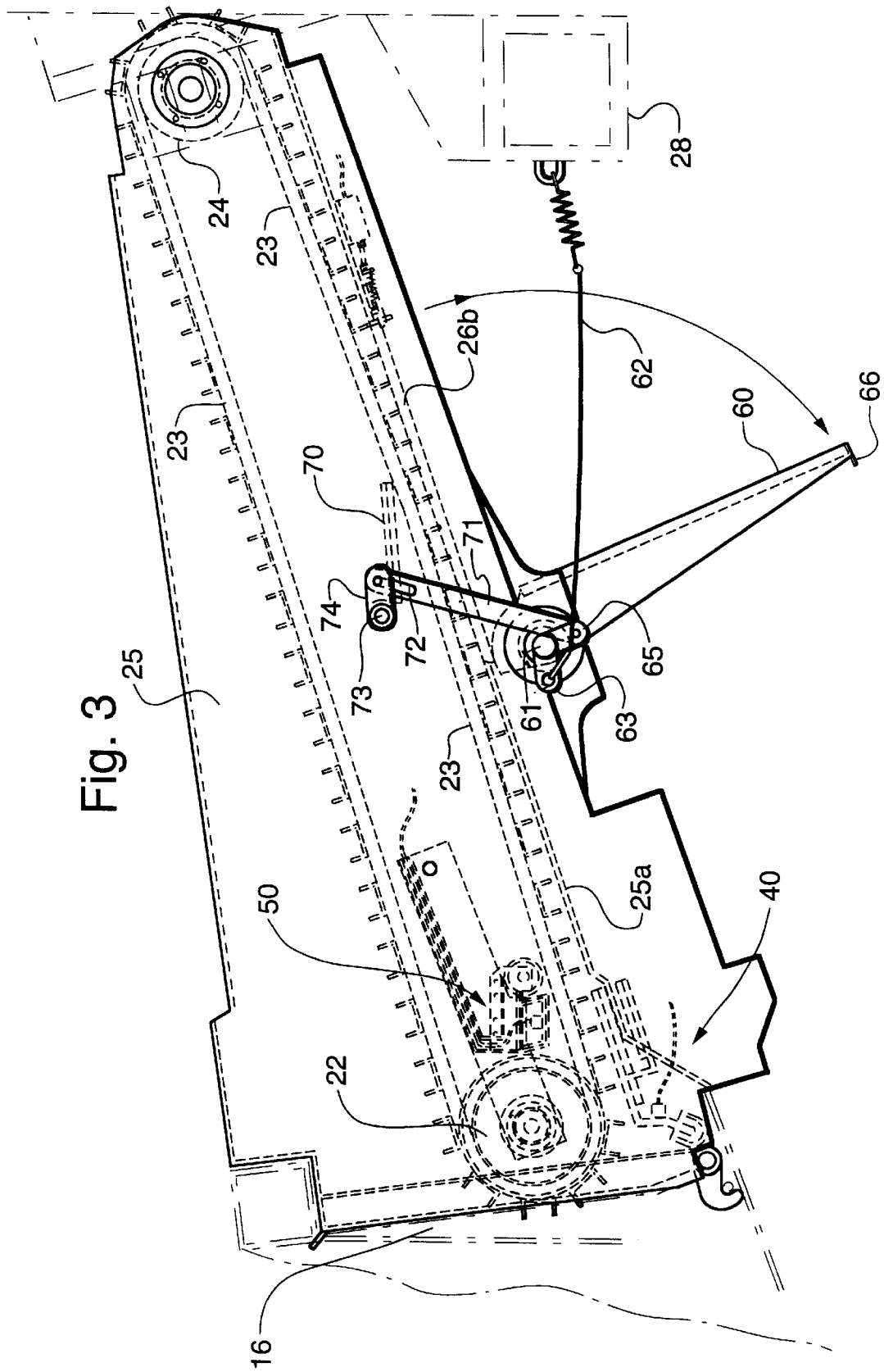
FIG. 3 is an over-all side elevation of a combine equipped with a feederhouse showing the rotational movement of the stone trap door.
Figure 4:
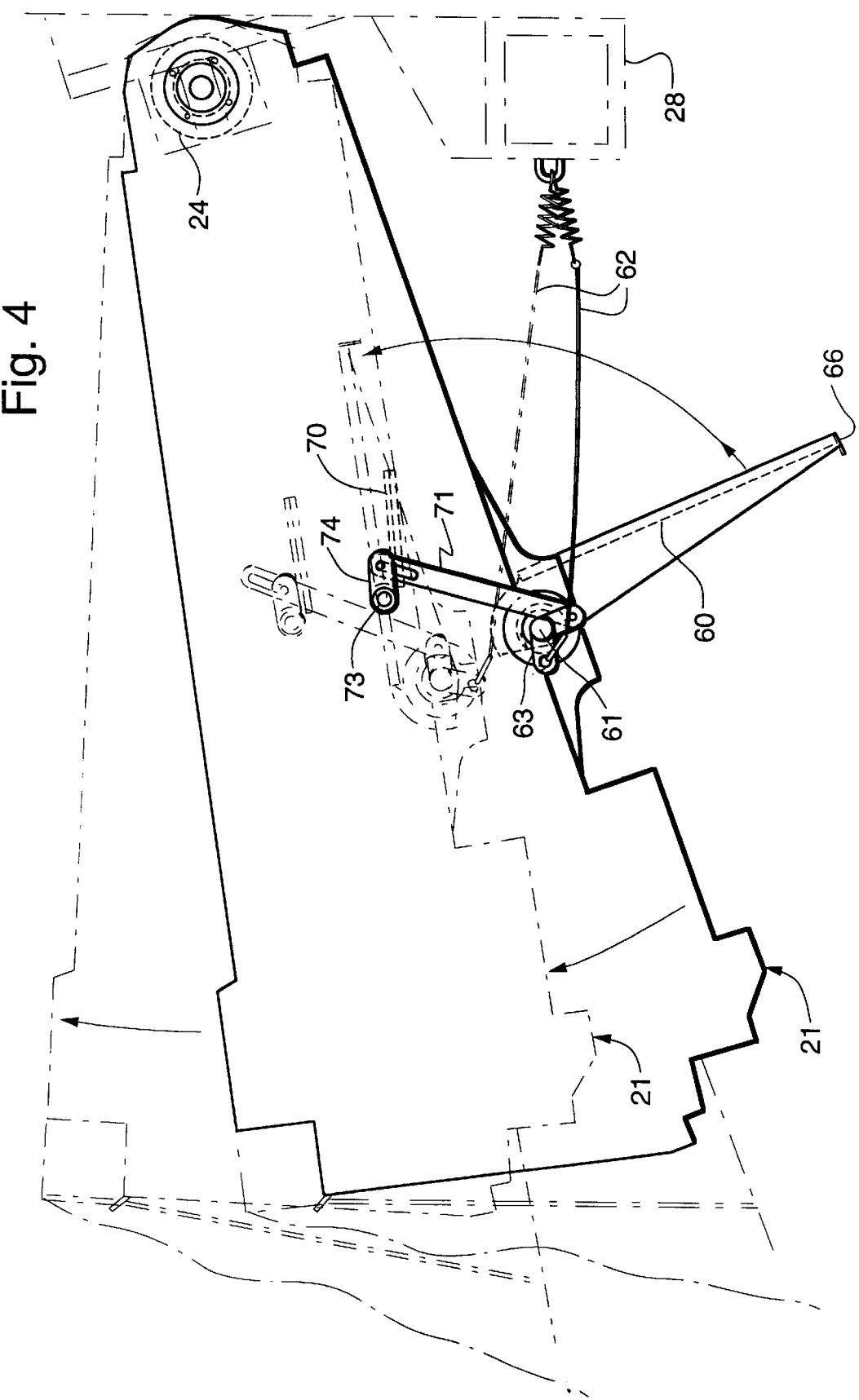
FIG. 4 is an over-all side elevation of a combine equipped with a feederhouse showing the rotational movement of the feederhouse where the door cable pulls the stone trap door closed.

The acoustic stone detector for a combine harvester feederhouse 35 may generally be observed in FIG. 1 and more specifically in FIGS. 2 through 7. As seen in FIG. 2, there is a first acoustic array 40 and second acoustic array 50 located proximate to the front drum 22 of the feederhouse 21. These acoustic arrays 40 and 50 transmit a signal that triggers a solenoid 77. The solenoid 77 opens a latch 75 allowing the stone trap door 60 to fall open (see FIGS. 3 and 4). This allows the stone 30 to drop out of the feederhouse 21. The operator then raises the feederhouse 21 (as seen in FIG. 4); the door cable 62 pulls the stone trap door 60 into contact with the latch 75. Now that the general elements of the invention have been reviewed, a more specific discussion will follow.

Figure 5:
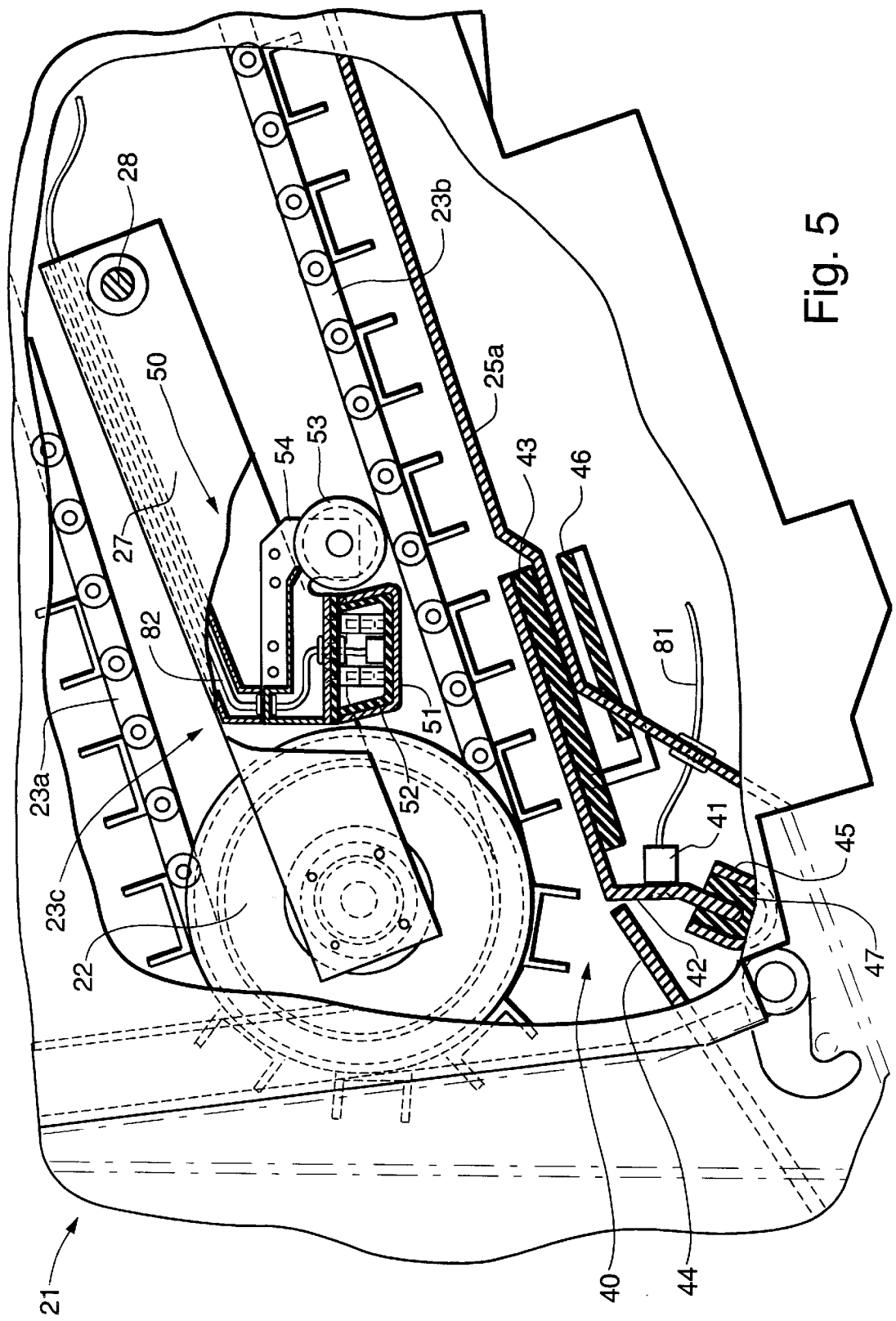
FIG. 5 is a cut-away, close-up view of the first and second acoustic arrays.
Figure 6:
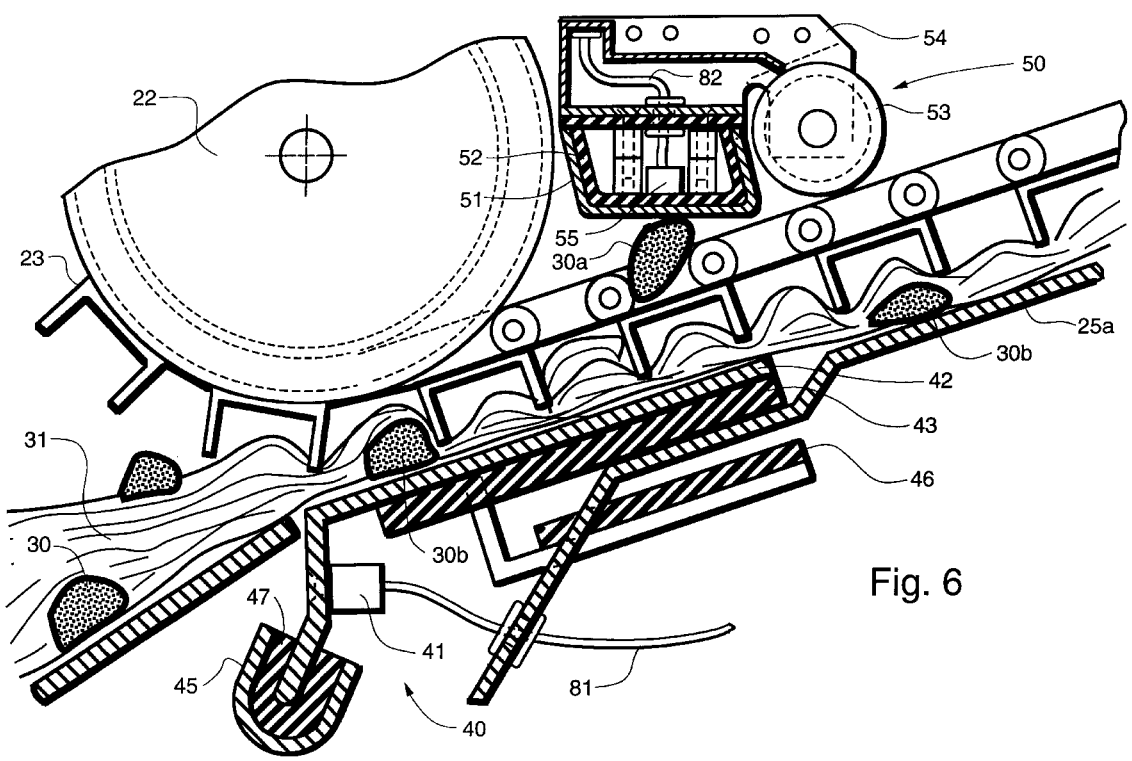
FIG. 6 is a cut-away, close-up view of the first and second acoustic arrays showing a crop flow with stones passing through the feederhouse.

The first acoustic array 40 is located beneath the front drum 22 as seen in FIGS. 5 and 6. It consists of a first acoustic sensor 41 monitoring the first sounding plate 42. In the preferred embodiment, the first acoustic sensor 41 is an accelerometer, Bosch™ sensor, model number 84058692. The acoustic sensor 41 could also be a microphone or similar listening device. The acoustic sensor 41 is affixed to the first sounding plate 42. The first sounding plate 42 extends roughly parallel to the feederhouse floor 25a. The first sounding plate 42 is positioned beneath the front drum 22 and behind an entry plate 44 extending from the header 12. To prevent the sounding plate 42 from detecting stray sounds, the plate is insulated from the remainder of the feederhouse. Between the first sounding plate 42 and the feederhouse floor 25a is the first insulated plate 43. Beneath the feederhouse floor 25a is the second insulated plate 46. The sounding plate 42 is contoured to partially project beneath the entry plate 44 to further minimize the sensor 41 from receiving stray noise. A 'U' channel 45 supports this contoured portion of the first sounding plate 42. Again, the 'U' channel is insulated with 'U' channel insulation 47 so as to minimize stray noise. The first acoustic sensor 42 transmits a first sensor signal through the first sensor wire 81. A stone 30 impacting the first sounding plate 42 is detected by the first acoustic sensor 41 which sends a first signal through the first sensor wire 81. While FIG. 5 details only one sensor 41, it should be understood that a series of sensors might be affixed onto the first sounding plate 42 beneath the front drum 22 and entry plate 44.

The second acoustic array 50 is positioned in a mounting zone 23c. The mounting zone 23c is defined as the region between the upper apron 23a and lower apron 23b of the conveyor chain 23 and behind the front drum 22. As viewed in FIGS. 5 and 6, the second acoustic array is positioned very close to the front drum 22. The second acoustic array 50 has a second acoustic sensor 55 attached to a sounding plate or channel 51. The second acoustic sensor 55 is identical to the first acoustic sensor 41 and is a Bosch™ accelerometer model number 84058692. It is important that the second acoustic sensor 55 be positioned close to the front drum 22 and between the upper apron 23a and lower apron 23b as possible. In the preferred embodiment, the second acoustic sensor is positioned 195.5 mm behind the center of the front drum 22. It is also important that the second sounding plate or channel 51 not contact the front drum 22 or conveyor chain 23. To avoid the channel 51 from receiving stray noises, there channel 51 has channel insulation 52.

As seen in FIGS. 2A and 5, the channel 51 is affixed on a pair of drum arms 27. The drum arms 27 are pivotally attached to the sidewall 25 of the feederhouse 21 at the drum arm pivot 28. The front drum is rotationally attached and the opposite end of each drum arm 27. As previously mentioned, in order to prevent the channel 51 from receiving stray noise, it is important that the upper apron 23a and lower apron 23b not contact the channel 51. In order to prevent this from occurring, a roller 53 attached by a roller support 54 to the channel 51 is utilized to keep the lower apron 23b from touching the channel 51. The second acoustic sensor 55 transmits a second sensor signal through the second sensor wire 82. As seen in FIG. 6, a stone 30 impacting the channel 51 is detected by the second acoustic sensor 55 which sends a second signal through the second sensor wire 82. As detailed in FIG. 2A, a series of sensors may be affixed onto the channel 51.

FIG. 6 illustrates a crop flow 31 containing several stones. Stones at the bottom of the crop flow 31 impact the first sounding plate 42 and that impact is detected by the first acoustic sensor 41. Stones at the top of the crop flow 31 impact the second sounding plate or channel 51 and that impact is detected by the second acoustic sensor 55. A single acoustic array located beneath the front drum and lacking the modified sounding plate 42 only detected 40–50 percent of stones 30 entering the feederhouse. However, the addition of the second acoustic array 50 and modified first sounding plate 42 has resulted in a 92–96 percent detection of the stones entering the feederhouse.

The stone trap door 60 is pivotally attached to the feederhouse floor 25a by a hinge 61. When the door 60 is closed (as seen in FIG. 2), it seals the floor aperture 26a. The floor aperture is an opening in the feederhouse floor 25a. When the door 60 rotates downwards (as seen in FIG. 3), the floor aperture 26a is opened and crop material can drop to the ground. Affixed to the hinge 61 is the cable link 62 and sled link 65. Pivotally attached to the sled link 65 is the sled linkage 71. The sled linkage 71 has a linkage slot 72. Located between the upper apron 23a and lower apron 23b is the stone ejection sled 70. The ejection sled 70 is pivotally attached to the sidewall 25 by a sled hinge 73. Affixed to the sled hinge 73 is the sled hinge link 74. The opposite end of the sled hinge link 74 is slideably attached to the sled linkage 71 through the linkage slot 72.

Receiving the first sensor signal through the first sensor wire 81 is the controller 81. The controller 81 also receives the second sensor signal through the second sensor wire 82. The controller 81 than transmits a solenoid signal through the solenoid wire 83 to the solenoid 77. The controller 81 in the preferred embodiment is a New Holland® controller model number CEM 86565041.

The solenoid 81 is a push-type solenoid and in the preferred embodiment New Holland® solenoid model 681923 was used. The solenoid 81 receives the solenoid signal from the controller 81 through the solenoid wire 83. Upon receiving this signal the solenoid 77 retracts a spring 76-biased latch 75 holding the stone trap door 60 closed. As seen in FIG. 3, after the latch is retracted, the stone trap door 60 rotates downward allowing a portion of the crop flow containing a stone to exit through the door aperture 26a. At the same time, the sled link rotates clockwise (as viewed in FIG. 3) pulling the sled linkage 71 and sled hinge link 74 downward. This rotates the sled hinge and attached stone ejection sled 70 downwards. The sled 70 contacts and deflects the lower apron 23b downwards. This helps to deflect the crop flow 31 containing a stone through the floor aperture 26b. In the preferred embodiment, the stone trap door 60 rotates approximately 75 degrees and the stone ejection sled rotates approximately 25 degrees.

FIG. 4 illustrates how the stone trap door 60 is closed over the floor aperture 26b. While the door 60 is open, the feederhouse is raised or rotated clockwise (as seen in FIG. 4) about the rear drum 24. A door cable 62 attached to the cable link 62 and combine frame 28 tightens and rotates the stone door 60 counter-clockwise. The spring-biased latch 75 is inserted through a latch catch on the door 60. This ensures that the door remains closed, those preventing any inadvertent crop loss.

The stone detection and ejection system operates as follows. A stone enters the header 12 and is moves with the crop flow to the feederhouse 21. The crop flow 31 passes between the front drum and feederhouse floor 25a. Stone 30b contacts the first sounding plate 42 or stone 30a contacts the channel or second sound plate 51. An acoustic sensor either 41 or 55 detects the impacts and transmits a sensor signal through the sensor wire 81 or 82 to the controller 80. The controller 80 transmits a solenoid signal through the solenoid wire 83 to the solenoid 77. The solenoid 77 retracts the latch 75 from the latch catch 66 on the stone trap door. The stone trap door swings open allowing the portion of the crop flow containing a stone to exit the feederhouse 21 through the floor aperture 26b. The sled link attached to the hinge 61 pulls the sled linkage 71 and sled hinge link 74 downwards. The sled hinge link 74 rotates the sled hinge 73. The ejection sled, which is affixed to the sled hinge 73, is rotated into contact with the lower apron 23b. The sled 70 deflects the lower apron 23b and helps eject additional crop flow containing any stones. After the stone is ejected, the feederhouse is raised. A door cable 62 pulls the stone trap door 60 closed. The latch 75 is re-inserted into the latch catch 66.

It will be obvious to those skilled in the art that various changes may be made without departing from the scope of the invention and the invention is not to be considered limited to what illustrated in the drawings and described in the specification.

What is claimed is:

1. An stone ejection system for ejecting a stone in a feederhouse of an agricultural combine comprising:
    a. said feederhouse having a sidewall and a feederhouse floor;
    b. a front drum rotationally attached to the sidewall;
    c. a rear drum rotationally attached to the sidewall;
    d. a conveyor chain encircling the front drum and the rear drum, said chain having an upper apron returning from the rear drum to the front drum and a lower apron returning from the front drum to the rear drum;
    e. a crop flow entering the feederhouse proximate to the front drum, said crop flow passing beneath said front drum and lower apron and above the feederhouse floor;
    f. said feederhouse floor having a floor aperture, therein;
    g. a stone trap door pivotally attached to the feederhouse floor by a door hinge, said door covering the floor aperture; and
    h. said stone trap door capable of rotating in response to the a signal sent to a solenoid, the stone trap door rotating so as to uncover said floor aperture.

2. The stone ejection system in claim 1 further comprising:
    a. a stone ejection sled pivotally attached to the sidewall by a sled hinge;
    b. a sled link affixed to the door hinge;
    c. a sled linkage pivotally attached to the sled link, said linkage having a linkage slot, therein; and
    d. a sled hinge link affixed to the sled hinge and slideably attached to the sled linkage by the linkage slot.

3. The stone ejection system in claim 2 further comprising a door cable affixed to the stone trap door and to a combine frame.

4. The stone ejection system in claim 3 further comprising:
    a. a latch affixed to the feederhouse floor, said latch in intermittent contact with the stone trap door; and
    b. said latch controlled by the actuation of the solenoid.

5. In a combine harvester, said combine having a header with a header frame and a sicklebar cutter, said header operationally connected to a threshing and separating system by a feederhouse, said threshing and separating system operationally connected to a grain tank, said grain tank operationally connected to a grain tank unload auger, said combine having an engine and a chaff spreader, said combine having a cab, said feederhouse have a sidewall and a feederhouse floor, said feederhouse also having a front drum and a rear drum rotationally attached to the sidewall, a conveyor chain encircling the front drum and the rear drum, said chain having an upper apron returning from the rear drum to the front drum and a lower apron returning from the front drum and to the rear drum, the improvement comprising a stone ejection system, said system further comprising:
    a. said feederhouse floor having a floor aperture, therein;
    b. a stone trap door pivotally attached to the feederhouse floor by a door hinge, said door covering the floor aperture, the stone trap door capable of rotating so as to uncover said floor aperture;
    c. a stone ejection sled pivotally attached to the sidewall by a sled hinge;
    d. a sled link affixed to the door hinge;
    e. a sled linkage pivotally attached to the sled link, said linkage having a linkage slot, therein;
    f. a sled hinge link affixed to the sled hinge and slideably attached to the sled linkage by the linkage slot, said stone ejection sled rotating in conjunction with the stone trap door, said sled hinge contacting the lower apron; and
    g. a latch affixed to the feederhouse floor, said latch in intermittent contact with the stone trap door.

* * * * *